(12) United States Patent
Coutu

(10) Patent No.: US 9,844,178 B2
(45) Date of Patent: Dec. 19, 2017

(54) THREE HEADED CUTTING APPARATUS FOR ATTACHMENT TO A LAWNMOWER TRACTOR

(71) Applicant: Christian Coutu, Windsor (CA)

(72) Inventor: Christian Coutu, Windsor (CA)

( * ) Notice: Subject to any disclaimer, the term of this patent is extended or adjusted under 35 U.S.C. 154(b) by 0 days.

(21) Appl. No.: 14/929,347

(22) Filed: Nov. 1, 2015

(65) Prior Publication Data
US 2017/0118913 A1    May 4, 2017

(51) Int. Cl.
A01D 34/66 (2006.01)
A01D 34/84 (2006.01)
A01D 43/00 (2006.01)
A01D 75/18 (2006.01)
A01D 101/00 (2006.01)

(52) U.S. Cl.
CPC .............. *A01D 34/84* (2013.01); *A01D 34/66* (2013.01); *A01D 43/00* (2013.01); *A01D 75/185* (2013.01); *A01D 2101/00* (2013.01)

(58) Field of Classification Search
CPC ...... A01D 75/185; A01D 34/84; A01D 34/66; A01D 43/00
USPC ........................................ 56/320.1, 235, 10.4
See application file for complete search history.

(56) References Cited

U.S. PATENT DOCUMENTS

| | | | |
|---|---|---|---|
| 2,838,901 A * | 6/1958 | Davis | A01D 34/863 56/10.3 |
| 2,898,723 A | 8/1959 | Goodall | |
| 3,152,431 A | 10/1964 | Ott et al. | |
| 3,721,074 A * | 3/1973 | Heth | A01D 34/863 56/10.4 |
| 3,750,376 A * | 8/1973 | Cioni | A01B 39/166 56/10.4 |
| 3,780,504 A | 12/1973 | Haseloff | |
| 4,901,508 A * | 2/1990 | Whatley | A01D 34/863 56/10.4 |
| 5,035,108 A | 7/1991 | Meyer et al. | |

(Continued)

*Primary Examiner* — John Weiss

(57) ABSTRACT

A three headed cutter is comprised of a cover assembly under which are located the three cutting head assemblies. The cover assembly, along with the cutting head assemblies, are designed so as to rotate around impediments. the cover assembly pivots around a central axis. The three headed cutter has a connecting member which connects it to the tractor by way of an articulated boom arm. The boom arm connects with the connecting member at a pivot point, from which a biasing means is also connected. The biasing means and pivot point allow for the cover assembly to take in the shock of hitting an impediment by having the boom arm move at its pivot point so as to move the cover without damage just before the start of its rotation around the impediment. Each of the three cutting head assemblies consists of a twin blade member and a caster. The caster rotates with the cutting head assemblies. The cover assembly is further supported by a support wheel which takes on the load from the connecting member and the articulated boom arm. The central axis has a motor from which extends downwardly a shaft member, which itself connects to a multiple track pulley which has three belts, one for each cutting head pulley, which themselves connect directly to the cutting head by way of a short shaft member. Tension pulley assemblies, which consist in a pulley and biasing means assembly, keep tension on the belts.

11 Claims, 5 Drawing Sheets

(56) References Cited

U.S. PATENT DOCUMENTS

| | | | |
|---|---|---|---|
| 5,197,268 A | 3/1993 | Barrera | |
| 5,205,112 A | 4/1993 | Tillotson et al. | |
| 5,704,201 A * | 1/1998 | Van Vleet | A01D 34/863 56/14.9 |
| 6,301,863 B1 * | 10/2001 | Liebrecht | A01D 34/84 56/10.6 |
| 6,591,592 B1 * | 7/2003 | Krimminger | A01D 34/863 56/10.4 |
| 8,316,627 B1 * | 11/2012 | Fraley | A01D 34/84 56/10.4 |
| 8,713,904 B1 * | 5/2014 | Goudy | A01D 34/661 56/15.5 |
| 8,769,918 B2 * | 7/2014 | Williams | A01D 34/84 56/17.5 |
| 9,010,076 B2 * | 4/2015 | Hafner | A01D 34/835 56/10.4 |

* cited by examiner

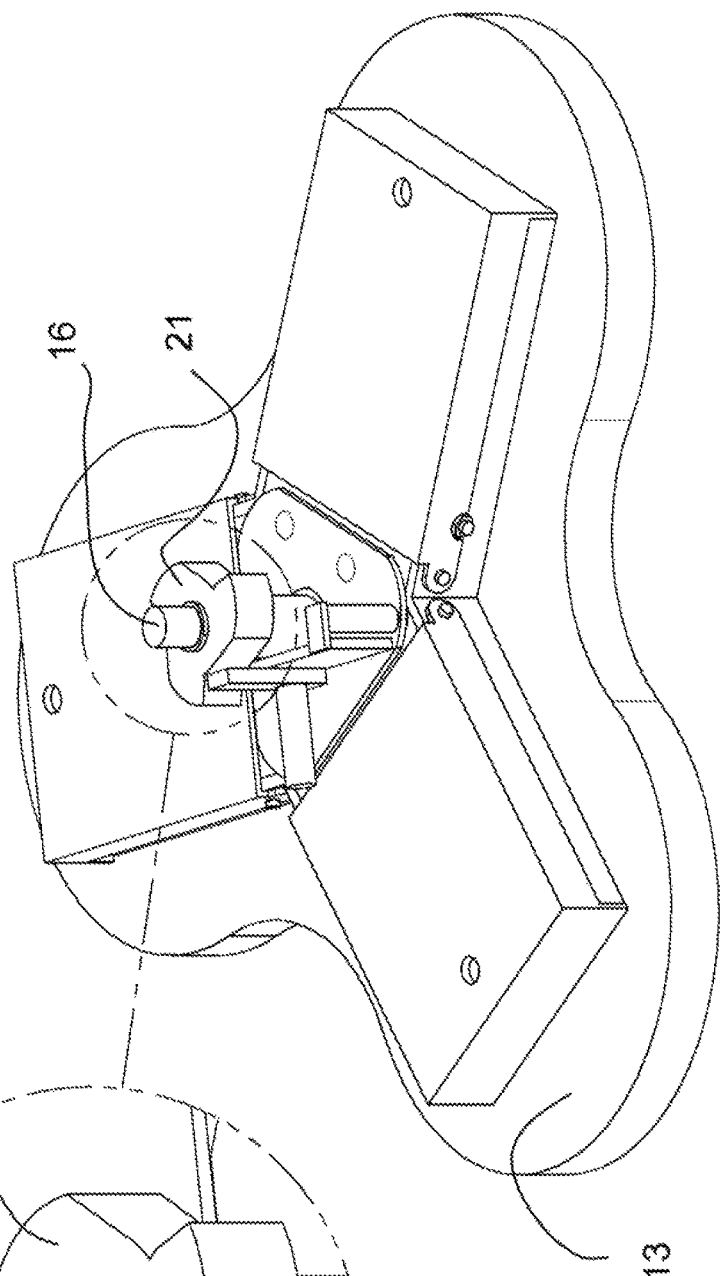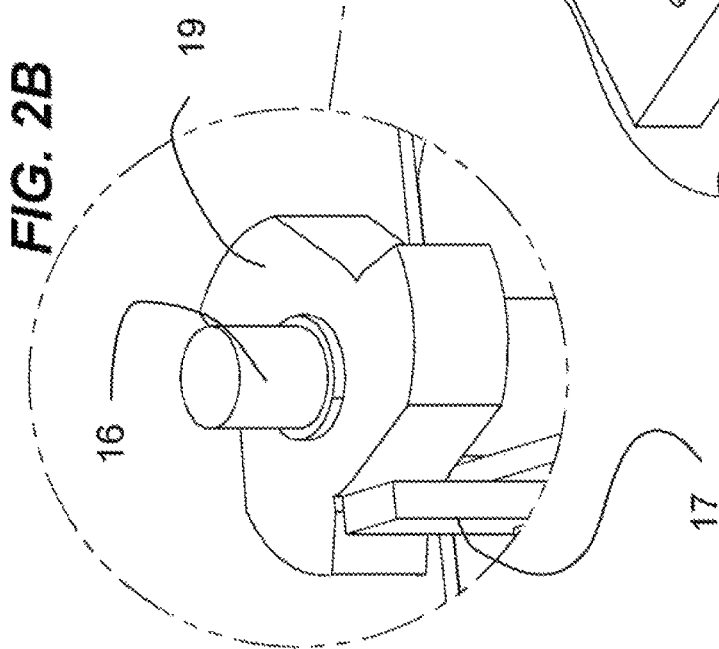

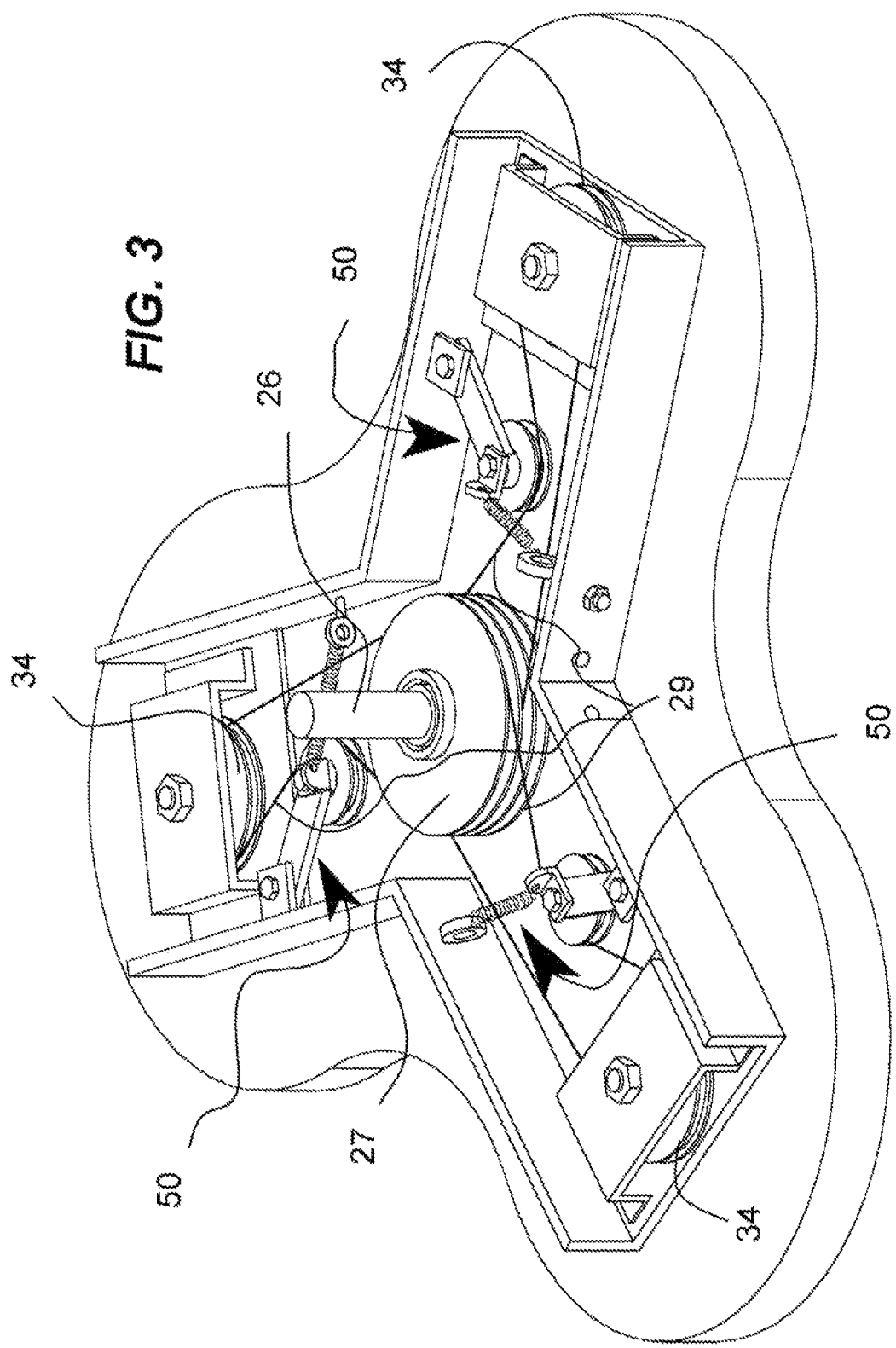

US 9,844,178 B2

THREE HEADED CUTTING APPARATUS FOR ATTACHMENT TO A LAWNMOWER TRACTOR

FIELD OF THE INVENTION

The present invention relates generally to mowing equipment but more particularly to a three headed cutter apparatus for attachment to a lawnmower tractor.

BACKGROUND OF THE INVENTION

Cutting grass around impediments such as trees or posts can slow down the mowing process. More often than not, a lawnmower or, even more so, a lawn mowing tractor has to go around the impediment and miss patches of grass. This has to be cut later using a weed wacker. There are some tractors that can pivot on a set of bi-directionally rotating wheels so that they can pivot on themselves and provide better cutting but they do require great skill from the operator. There are also attachments tagged onto lawn mowing tractors. Some have support wheels to help support the attachment as well as help when going over curbs or large bumps on the ground, but they prove cumbersome more than useful. There has to be a better way to get around those impediments.

SUMMARY OF THE INVENTION

In view of the foregoing disadvantages inherent in the known devices now present in the prior art, the present invention, which will be described subsequently in greater detail, is to provide objects and advantages which are:

To provide for an edge trimmer that can be adapted to a lawn mowing tractor to speed up the trimming process.

In order to do so, the invention comprises an accessory that is attached to the side of a lawn mowing tractor and has three cutting head assemblies positioned in a triangular fashion and which pivot around a central axis so that when when a head hits an impediment, it rotates all three heads around the central axis so that the next head can continue trimming around the impediment. All three heads are located to the side of the tractor so that their trimming ends where the main bade of the lawnmower tractor begins.

The three headed cutter is comprised of a cover assembly under which are located the three cutting head assemblies. The cover assembly, along with the cutting head assemblies, are designed so as to rotate around impediments. the cover assembly pivots around a central axis.

A ratcheting means consisting of a paw and toothed gear allows the cover assembly to pivot in only one direction. The three headed cutter has a connecting member which connects it to the tractor by way of an articulated boom arm. The boom arm connects with the connecting member at a pivot point pivoting around a vertical axis, from which a biasing means is also connected. The biasing means and pivot point allow for the cover assembly to take in the shock of hitting an impediment by having the boom arm move at its pivot point so as to move the cover without damage just before the start of its rotation around the impediment. Each of the three cutting head assemblies consists of a twin blade member and a caster. The caster rotates freely so that it can point in all directions according to the travel direction of the cover assembly. The cover assembly is further supported by a support wheel which takes on the load from the connecting member and the articulated boom arm. The central axis has a motor from which extends downwardly a shaft member, which itself connects to a multiple track pulley which has three belts, one for each cutting head pulley, which themselves connect directly to the cutting head by way of a short shaft member. Tension pulley assemblies, which consist in a pulley and biasing means assembly, keep tension on the belts.

The cover assembly has rounded edges which define three sections, which are equidistant from each other.

The cover assembly is further comprised of lid members, one for each section, to give access to the cutting head assemblies.

The connecting member is hingedly attached to the tractor.

The motor can be electric or hydraulic, or driven by a flexible shaft connecting to a compatible output on the tractor.

The ratcheting means has a three toothed gear.

The three headed cutter is used in combination with a lawnmower tractor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

BRIEF DESCRIPTION OF THE DRAWINGS

FIGS. 2a-b Isometric view of the cover and detail of ratchet assembly.
FIG. 3 Isometric view of the cover with lids removed.

DETAILED DESCRIPTION

Figure 1:
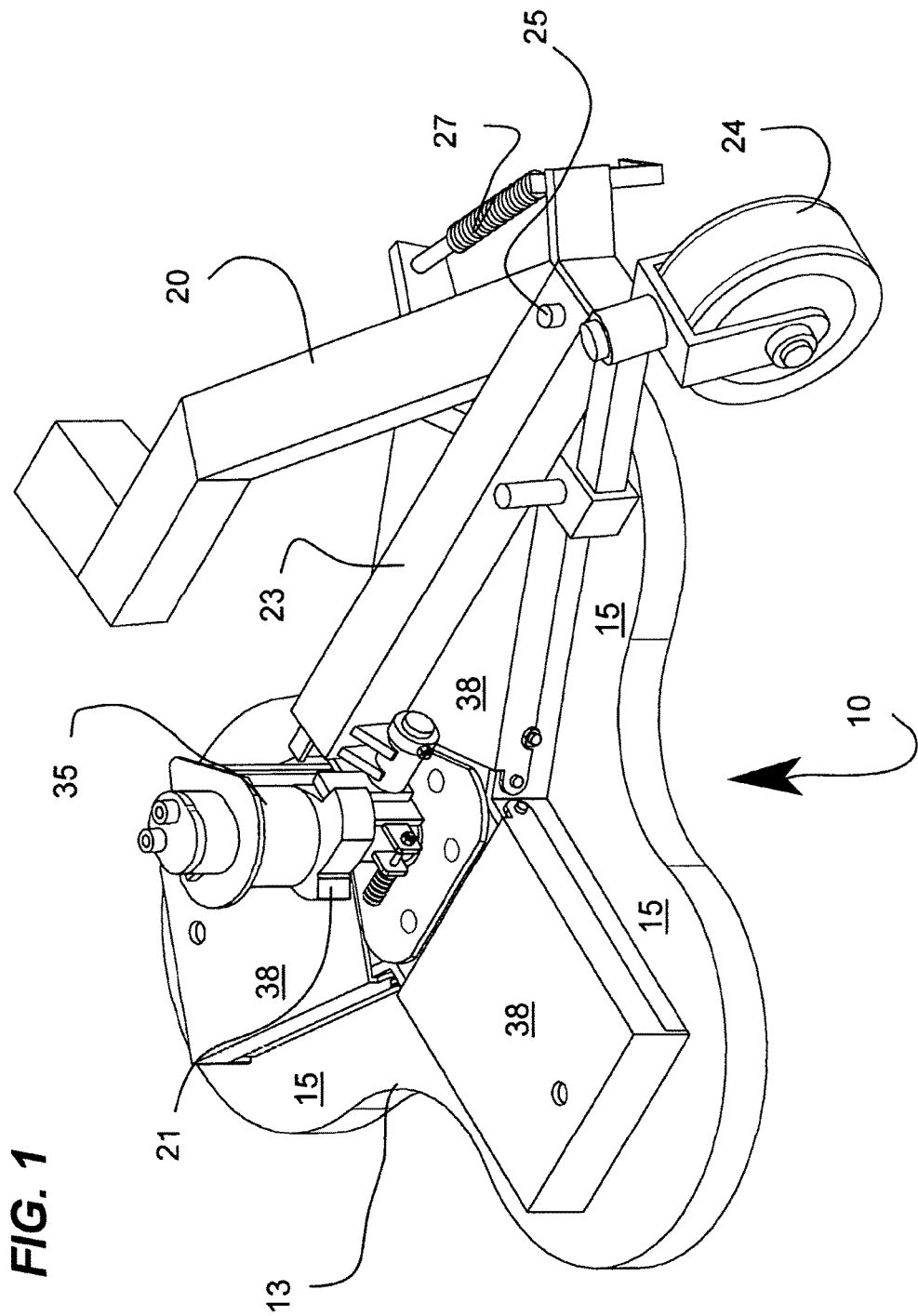
FIG. 1 Isometric view of the invention.
Figure 4:
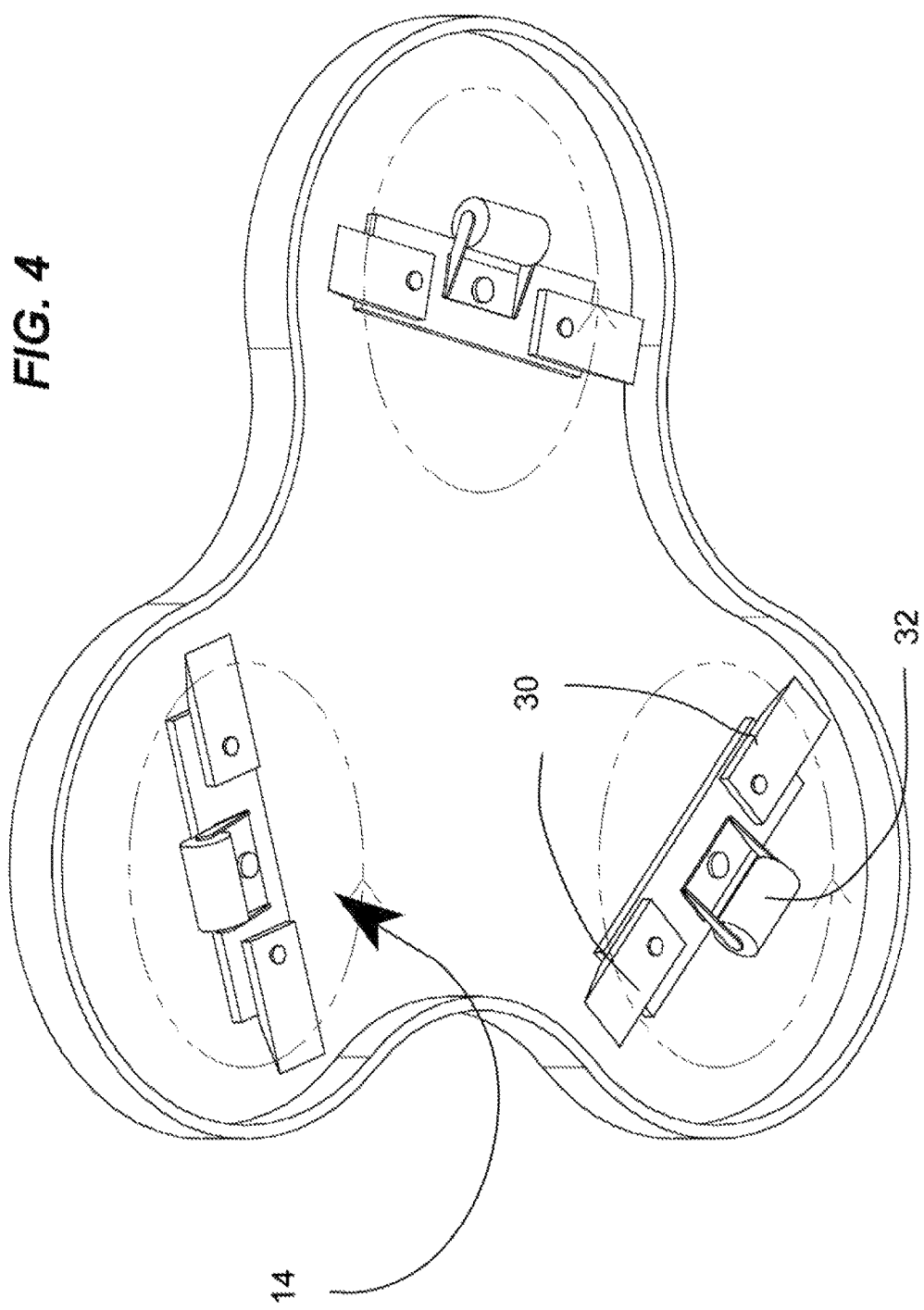
FIG. 4 Isometric view of the underside of the cover.
Figure 5:
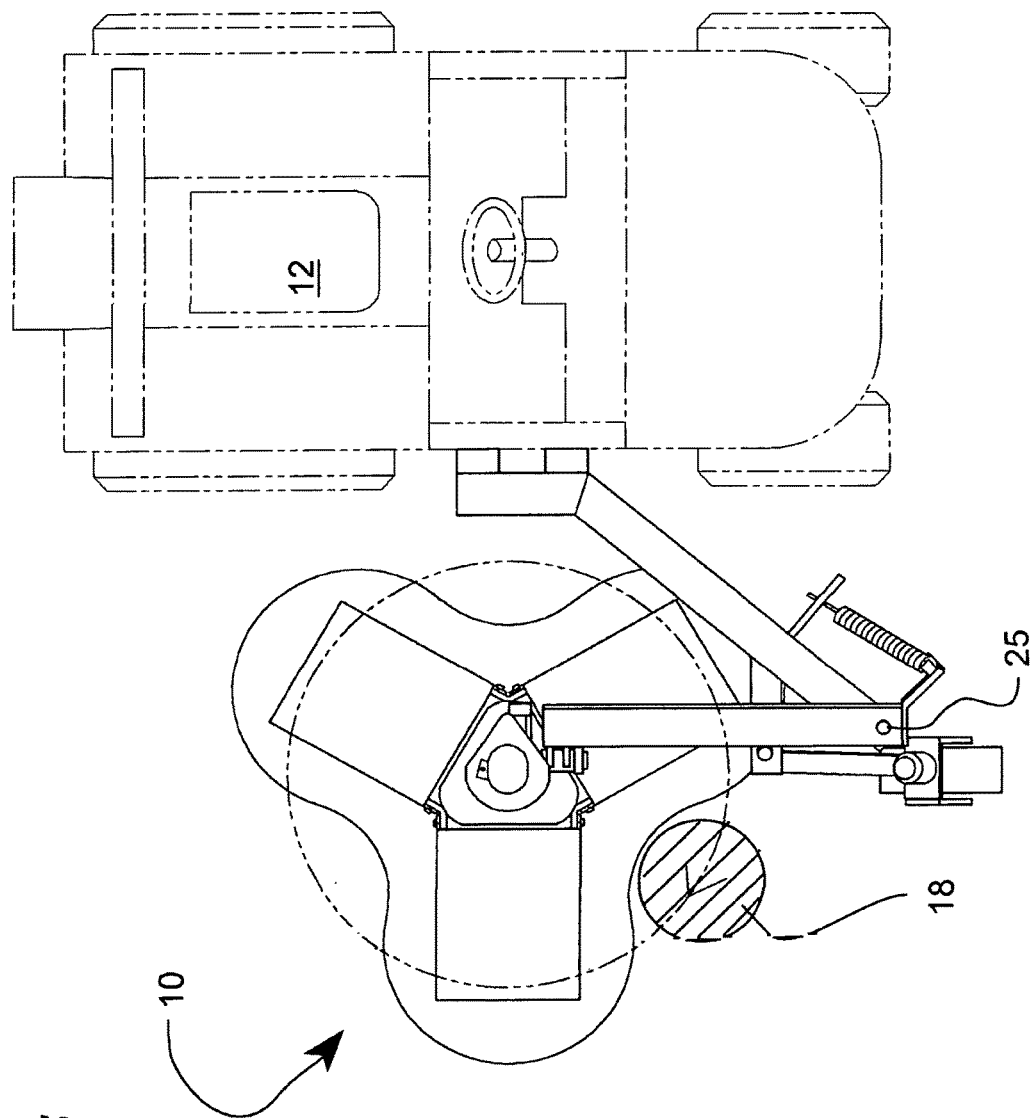
FIG. 5 Top view of the tractor and the invention.

A three headed cutter apparatus (10) is attached to a lawn mower tractor (12). It is comprised of a cover assembly (13)

under which are located three cutting head assemblies (14) positioned in a triangular fashion. The cover assembly (13) along with the cutting head assemblies (14) are designed so as to rotate around impediments (18) as it pivots around a central axis (16). With the three cutting head assemblies (14) configuration, there is always another cutting head assembly (14) to take over to continue trimming around the impediment (18). All three cutting head assemblies (14) are located to the side of the tractor (12) so that their trimming ends where the main bade (not shown) of the lawnmower tractor (12) begins. A ratcheting means (21) consisting of a pawl (17) and three toothed gear (19) allows the cover assembly (13) to pivot in only one direction.

The three headed cutter assembly (10) has a connecting member (20) which connects it to the tractor (12) by way of an articulated boom arm (23). The boom arm (23) connects with the connecting member (20) at a pivot point (25), from which a biasing means (27) is also connected. The biasing means (27) and pivot point (25) allow for the cover assembly (13) to take in the shock by having the boom arm (23) move at its pivot point (25) so as to move the cover assembly (13) without damage just before the start of its rotation around the impediment (18).

Each of the three cutting head assemblies (14) consist of a twin blade member (30) and a caster (32). The casters (32) rotate freely so that they can point in all directions according to the travel direction of the cover assembly. What that means is that they can roll at all time in the direction of the tractor and keep the cutting head assemblies (14) and the cover assembly (13) at a proper height relative to the ground surface.

In the middle of the cover assembly (13) is the central axis (16) which has a motor (35) from which extends downwardly a shaft member (26), which itself connects to a multiple track pulley (27) which has three belts (29), one for each cutting head pulley (34), which themselves connect directly to the cutting head assemblies (14) by way of a short shaft member (36). Tension pulley assemblies (50), which consist in a pulley and biasing means assembly, keep tension on the belts (29).

The motor (35) can be electric or hydraulic, or driven by a flexible shaft connecting to a compatible output on the tractor (12).

The cover assembly (13) has rounded edges which define three sections (15), which are equidistant from each other. For example, the casters (32) in each of the three sections could each represent a point in an equilateral triangle. The generally curvy shape helps with the rotation of the cover assembly (13) when it impacts an impediment.

The cover assembly (13) is further made out of lid members (38), one for each section (15) to facilitate access as well as replacement of the parts located within the sections (15).

The connecting member (20) is hingedly attached to the tractor (12) so that it, as well as the cover assembly (13). can be lifted for general maintenance and repairs.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A cutter having three cutting heads for use as attachment to a lawnmower tractor is comprised of a cover assembly under which are located said three cutting head assemblies positioned in a triangular fashion; said cover assembly along with said cutting head assemblies are designed so as to rotate around impediments; said cover assembly pivots around a central axis; a means for ratcheting consisting of a pawl and toothed gear allows said cover assembly to pivot in only one direction; said three headed cutter has a connecting member which connects it to said tractor by way of an articulated boom arm; said boom arm connects with said connecting member at a pivot point rotating around a vertical axis, from which a means for biasing is also connected; said means for biasing and pivot point allow for said cover assembly to take in the shock of hitting an impediment by having said boom arm move at its pivot point so as to move said cover without damage just before the start of said cover's rotation around said impediment; each of said three cutting head assemblies consists of a twin blade member connected to a caster; said casters rotating freely so that said casters can point in all directions according to the travel direction of the cover assembly; said cover assembly is pulled by said articulated boom arm so as to follow the direction of said lawnmower; said central axis has a motor from which extends downwardly a shaft member, which connects to a multiple track pulley which has three belts, one for each cutting head pulley, said each cutting head pulley connecting directly to said cutting head by way of a short shaft member; tension pulley assemblies, which consist in a pulley and means for biasing assembly, keep tension on said belts.

2. The cutter of claim 1 wherein said cover assembly has rounded edges which define three sections, which are equidistant from each other.

3. The cutter of claim 1 wherein said cover assembly is further comprised of lid members, one for each section, to give access to said cutting head assemblies.

4. The cutter of claim 1 wherein said means for ratcheting has a three toothed gear.

5. The cutter of claim 1 wherein said motor is an electric motor powered by an electric cable for connection to an alternator forming part of the tractor.

6. The cutter of claim 1 wherein said motor is a hydraulic motor powered by a hydraulic hose for connection to a hydraulic pump forming part of the tractor.

7. A combination of a cutter having three cutting heads for use as attachment to a lawnmower tractor is comprised of a cover assembly under which are located said three cutting head assemblies positioned in a triangular fashion; said cover assembly along with said cutting head assemblies are designed so as to rotate around impediments; said cover assembly pivots around a central axis; a means for ratcheting consisting of a pawl and toothed gear allows said cover assembly to pivot in only one direction; said three headed cutter has a connecting member which connects it to said tractor by way of an articulated boom arm; said boom am, connects with said connecting member at a pivot point rotating around a vertical axis, from which a means for biasing is also connected; said means for biasing and pivot point allow for said cover assembly to take in the shock of hitting an impediment by having said boom arm move at its pivot point so as to move said cover without damage just before the start of said cover's rotation around said impediment; each of said three cutting head assemblies consists of a twin blade member connected to a caster; said casters rotating freely so that they can point in all directions according to the travel direction of the cover assembly; said cover assembly is pulled by said articulated boom arm so as to follow the direction of said lawnmower; said central axis has a motor from which extends downwardly a shaft member, which connects to a multiple track pulley which has three belts, one for each cutting head pulley, said each cutting head pulley connecting directly to said cutting head by way of a short shaft member; tension pulley assemblies, which consist in a pulley and means for biasing assembly, keep tension on said belts.

8. The combination of claim 7 wherein said cover assembly has rounded edges which define three sections, which are equidistant from each other.

9. The combination of claim 7 wherein said cover assembly is further comprised of lid members, one for each section, to give, access to said cutting head assemblies.

10. The combination of claim 7 wherein wherein said motor is an electric motor powered by an electric cable for connection to an alternator forming part of the tractor.

11. The combination of claim 7 wherein said motor is a hydraulic motor powered by a hydraulic hose for connection to a hydraulic pump forming part of the tractor.

* * * * *